United States Patent [19]
Hinkle, Jr.

[11] 4,090,193
[45] May 16, 1978

[54] FREQUENCY MULTIPLEXED WATER LEAK DETECTION SYSTEM

[75] Inventor: Francis E. Hinkle, Jr., Austin, Tex.

[73] Assignee: The United States of America as represented by the Secretary of the Navy, Washington, D.C.

[21] Appl. No.: 744,560

[22] Filed: Nov. 24, 1976

[51] Int. Cl.² ............................................. G08B 19/00
[52] U.S. Cl. .................................... 340/412; 340/242; 340/244 C
[58] Field of Search ................. 340/52 F, 59, 58, 242, 340/244 R, 244 C, 253 Y, 324 R, 409, 412, 413

[56] References Cited

U.S. PATENT DOCUMENTS

| | | | |
|---|---|---|---|
| 2,727,221 | 12/1955 | Sprigg | 340/58 |
| 3,949,358 | 4/1976 | Higashi | 340/52 F |
| 3,978,463 | 8/1976 | Kerscher | 340/244 C |

*Primary Examiner*—Alvin H. Waring
*Attorney, Agent, or Firm*—R. Sciascia; R. Beers; S. Sheinbein

[57] ABSTRACT

An active leak detector which uses frequency multiplexing to indicate the location of water leaks. The circuit is composed of any number of satellite leak detectors and a master indicator circuit which monitors all detectors simultaneously. Each detector unit is identified by a unique frequency warning signal which allows the indicator circuit to isolate and display the location of the leak. Only two wires are needed to connect all the detectors to the master indicator as well as supply the necessary power to the detectors.

10 Claims, 1 Drawing Figure

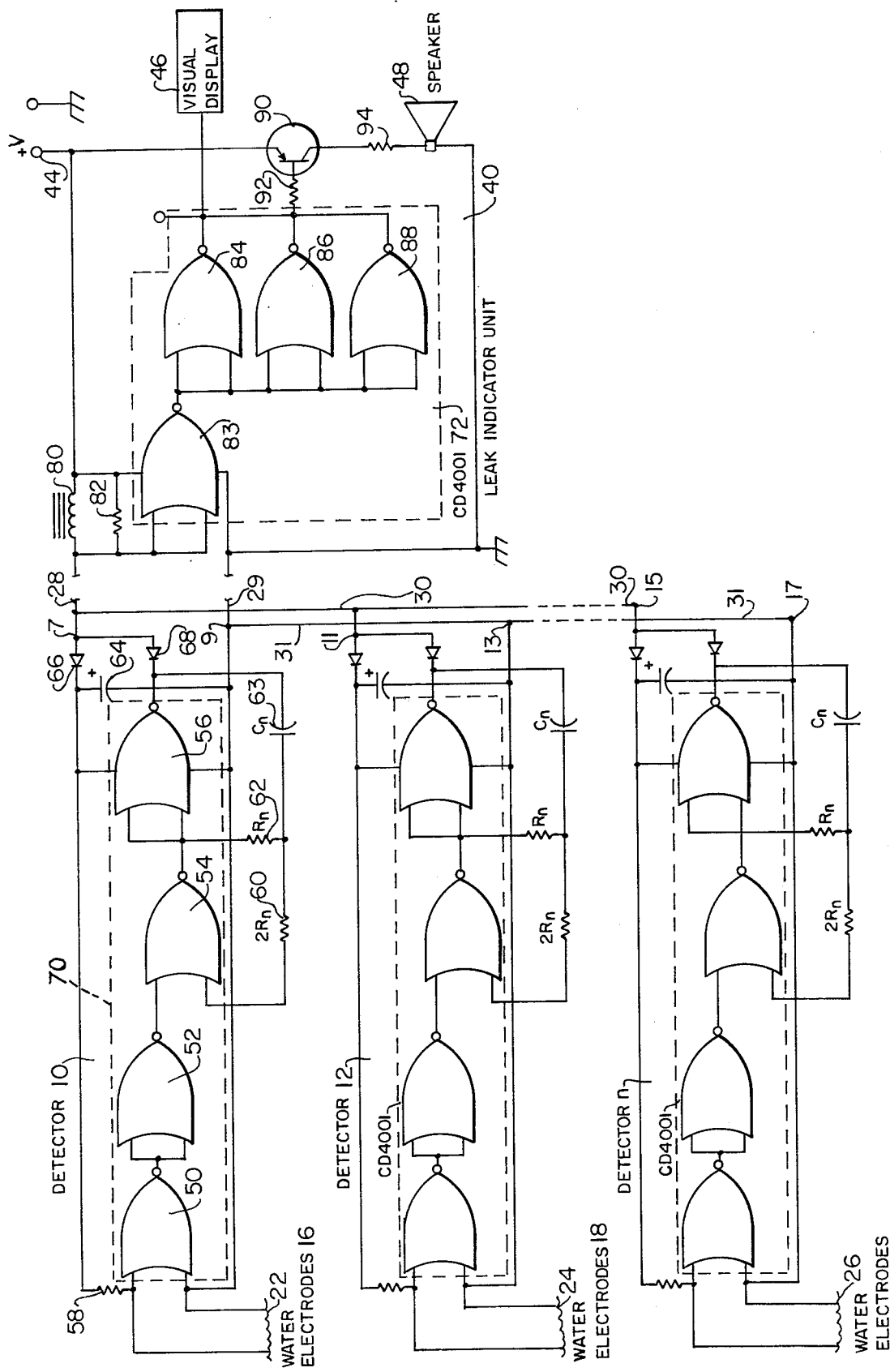

FREQUENCY MULTIPLEXED WATER LEAK DETECTION SYSTEM

BACKGROUND OF THE INVENTION

This invention relates generally to leak detection systems and more particularly to such systems which electronically isolate the location of water leaks.

The need to detect water leaks at any number of sites is common to public utilities, communications links, warehouses, chemical plants, and many other industries. Warning systems are required to indicate not only the existence of the leaks, but also their location, and the warning arrangement should be as simple as possible for reliability, efficiency, and economy.

In electronic equipment it is sometimes desirable to install electronic warning systems to detect the presence of a liquid resulting from a leak. Signals representing the presence or absence of a liquid at each of several locations are generated and monitored at a central point. Heretofore, systems for discovering and locating leaking fluids have manifested a number of disadvantages. Some systems have employed fluid sensitive switches connected directly to a central monitoring station. In a system employing many elements being monitored, a multiplicity of wires to identify the specific element would be required, making the system unwieldy and costly. Further, an active device requires a power source and the attendant increase of wires.

SUMMARY OF THE INVENTION

Accordingly, the present invention provides a system for detecting and locating fluid leaks requiring a minimum of interconnecting wires. The leak detection and location system encompasses an array of discrete detector circuits, each characterized by a unique oscillator frequency. When a leak is sensed by a particular detector by a current flow, that detector's oscillator is activated and the signal transmitted to a central monitoring station. The frequency of the signal received allows the central monitoring station to locate the source of the leak. All the signals from the oscillators and the D.C. supply voltage to operate the oscillators are supplied over identical two lines.

OBJECTS OF THE INVENTION

It is therefore an object of the present invention to provide a system for the detection and isolation of leaks.

A further object of the present invention is to provide for a leak detection system employing a minimum number of interconnecting wires.

Another object of the present invention is to provide for a low power consumption water leak detector.

Still another object of the present invention is to provide for easily increasing the plurality of locations to be monitored by a water leak detector.

Yet another object of the present invention is to provide a water leak detectors which are defined by unique oscillation frequency.

A further object of the present invention is to provide for a reliable, efficient, and economical integrated circuit water leak detector.

A still further object of the present invention is to simultaneously monitor a plurality of water leak detector units.

Still another object of the present invention is to provide a water leak detection system employing only two interconnecting wires, including those for the power source.

BRIEF DESCRIPTION OF THE DRAWING

Other objects and many of the attendant advantages of the present invention will be readily apparent as the invention becomes better understood by reference to the following detailed description with the appended claims, when considered in conjunction with the accompanying drawing wherein:

The FIGURE is a block diagram of the leak detector and location system according to the present invention.

DETAILED DESCRIPTION OF THE PREFERRED EMBODIMENT

Referring now to the FIGURE, an array of N leak detectors represented by a first detector 10, a second detector 12 and detector $n$. Each detector in the array is coupled in parallel to a central monitoring indicator unit 40 by means of two wires, an interconnect line 28 and an interconnect line 29, which coupling is accomplished as follows: Each detector of the array of N leak detectors is equipped with two output terminals. The interconnect line 28 is coupled directly to a terminal 7 of the first detector 10 and indirectly to a terminal 11 of the detector 12 and a terminal 15 of the detector $n$ by means of an interconnect line 30. Similarly, interconnect line 29 is coupled directly to a terminal 9 of the first detector 10 and indirectly to a terminal 13 of second detector and a terminal 17 of the $n^{th}$ detector by means of interconnect line 31. As will be explained hereinafter, the interconnect lines 28 and 29 serve a dual function, viz., to transmit electrical signals from the various leak detectors in the array of N detectors to indicator unit 40 and to supply power to each of the leak detectors in the array.

The structure and operation of the embodiment thus far described will now be discussed with reference to the first detector 10. It is to be understood, however, that each of the detectors in the array of N detectors is identical in basic operation and structure. As will be developed below, the single distinction, other than geographical location, between one detector of the array and another entails the assignment of certain component values so as to provide each detector with its unique frequency of oscillation. First detector 10 comprises a single complementary-MOS (CMOS) quad NOR gate integrated circuit 70 such as a conventional CD 4001 unit, and a few components. CMOS circuit 70 comprises four NOR gates 50, 52, 54, and 56 each with two interchangeable inputs and one output. NOR gate 50 is employed as a water sensor, NOR gate 52 as an inverter, and NOR gate 54 and 56 as an astable multivibrator. First NOR gate 50, has coupled across its two inputs a leak sensing means comprising a pair of water electrodes 16. This pair of water electrodes couples the first NOR gate 50, and thus the first detector 10, to an area 22 in which the water is to be monitored. In addition, terminal 7 is coupled through a diode 66 and a resistor 58 to one of the two inputs of the NOR gate 50 and terminal 9 is coupled to the other input. The output of the NOR gate 50 is coupled to both inputs of NOR gate 52. The output of the NOR gate 52 is coupled to one of the inputs of NOR gate 54. The other input of the NOR gate 54 is coupled through a resistor 60 and a capacitor 63 to the output of the NOR gate 56. The output of the NOR gate 54 is coupled to both inputs of second NOR gate 56. Likewise, the output of NOR gate 56 is fed back through a capacitor 63 and resistor 62 to both of its inputs. NOR gates 54 and 56, as is obvious, are thus arranged in a typical astable multivibrator configuration. The output of NOR gate 56 comprises the output of the first detector 10 and is coupled to the terminal 7 through a diode 68.

The mode of operation of first detector 10 will now be discussed, again with the understanding that, with certain specific distinctions which will be pointed out, the operation of the entire array of N detectors is identical.

Power is supplied to first detector 10 by a power supply 44, typically between +5 and +15 volts due to the lower power requirements of the CMOS circuitry, coupled to terminal 7 of the first detector 10 by means of the interconnect line 28. The pair of water electrodes 16, coupled between area 22 in which water level is to be monitored and the two inputs of the NOR gate 50, acts as a resistance across these two inputs. When the resistance of the pair of water electrodes 16 is greater than 500K ohms, as it will be in the absence of water, the output of NOR gate 50 will be a logic low level, NOR gate 52 high, and the astable multivibrator stage of the first detector 10 will be in a non-oscillating state. However, when the resistance of the pair of water electrodes 16 goes below 100K ohms, as it will in the presence of water at location 22, the logic level of the NOR gate 50 will switch to high due to current flowing between the two electrodes. NOR gate 52 simply inverts the logic level output of the NOR gate 50. This switch in the logic level of the NOR gate 52 from high to low triggers the astable multivibrator stage of the first detector 10 into its oscillation mode. The frequency of oscillation of the astable multivibrator is determined by the values of the resistors 62 and the capacitor 63, denominated $R_n$ and $C_n$, respectively. The values of these components establish the $R_nC_n$ time constant. The frequency of oscillation is given by the relationship:

$$F_n = 1/1.4\, R_n C_n\, \text{Hz}$$

Thus, by adjusting the values of the components which establish the $R_nC_n$ time constant, viz. resistor 62 and the capacitor 63, the frequency of oscillation of the astable multivibrator stage of first detector 10 can be varied.

From this it follows that each detector in the array of N detectors can be provided with a unique $R_nC_n$ time constant. In this manner, each of the detectors in the array of N detectors can be identified by its unique frequency of oscillation. In the case of the first detector 10, the oscillator output is transmitted to the indicator unit 40 by means of interconnect line 28 coupled between terminal 7 and indicator unit 40.

Since the interconnect lines 28 and 29 supply both power to the detectors and transmit the output oscillator signal to the indicator unit 40, the circuitry of the detectors must be isolated from the power circuitry. Diode 66 and the capacitor 64 form an isolation network to accomplish this function. Capacitor 64 is chosen to detect the peak supply voltage and store enough charge while the multivibrator is oscillating. The value for capacitor 64 is defined by the equation $$C_p = 1/1000 F_L \text{ farads}$$

where $F_L$ is the lowest frequency used in the detector circuits system. Since the multivibrator output is oscillating between 0 and +V volts, with a 50% duty cycle, the average value of the supply voltage is reduced considerably. The power supply diode 66 and capacitor 64 are used to peak detect the supply fluctuation and store the peak value. The equation for capacitor 64 allows for much less than 0.5 volt ripple on the CMOS power input, thus making the detector circuit immune to the fluctuation caused by the lowest frequency multivibrator oscillator. Similarly, to isolate first detector 10 from the oscillator output of each of the other detectors in the array of N detectors, diode 68 is coupled between interconnect line 28 and the output of first detector 10, i.e., the output of NOR gate 56. Collectively, these diodes form a multi-input OR gate.

The remaining detectors in the array of N detectors are coupled to the indicator unit 40 by means of interconnect lines 28 and 29 and interconnect lines 30 and 31. As with the first detector 10, the interconnect lines 28, 29, 30, and 31 both supply power to the various detectors from the power supply 44 and transmit output oscillator signals from the different detectors to indicator unit 40. Each of the detectors in the array of N detectors will monitor the water level in a different location. Thus, second detector 12 will monitor the water level in an area 24 by means of a pair of water electrodes 18 coupled between that detector and the area 24, and detector n will monitor the water level in an area 26 by means of a pair of water electrodes coupled between that detector and the area 26. As demonstrated above, by establishing a unique $R_nC_n$ time constant for each of the various detectors in the array of N detectors, each detector will generate a unique oscillator frequency output when water is detected. These output signals from the various detectors are transmitted by means of the interconnect lines 30 and 31 and the interconnect lines 28 and 29 to the indicator unit 40 which may be situated a great distance away from any of the detectors.

Indicator unit 40 operates to display the leak detection signals either by a visual indicator 46 or by means of an aural indicator 48. Indicator unit comprises a single CMOS digital integrated circuit 72, which may also be a standard CD 4001 unit, but configured in a different manner than the detectors, so as to function as a gate amplifier, and a transistor amplifier. The CMOS circuit comprises four logic elements, viz, NOR gates 83, 84, 86 and 88, each with two interchangeable inputs and a single output. Interconnect line 28 is coupled to both inputs of NOR gate 83. Power supply 44 is coupled through a low pass filter network comprising an inductor 80 and a resistor 82 to the interconnect line 28. The function of low pass filter network is to isolate the power supply 44 from the output oscillator signals of the various leak detectors. The value of inductor 80 is determined by the lowest frequency and the maximum current permitted during oscillations. If this current is taken to be 1 milliamperes for CMOS devices used, the value of inductor 80 is about $1600/F_L$ in henries. This value of inductance seems large if $F_L$ is a few hundred hertz, but the low currents permit use of miniature types of coils. Resistor 82 shunts coil 80 so that no signal will see an impedance greater than 10K ohms. The output oscillator signals from the detectors are transmitted directly on lines 28 and 29 to both inputs of NOR gate 83 causing it to oscillate with the frequency of the signal received from the detectors. The output of the NOR gate 83 is coupled to both inputs of each of NOR gates 84, 86 and 88 which outputs are coupled through a resistor 92 to the base of transistor 90, and thus control the aural output of speaker 48, which emits the tone that identifies the location of the leak. If desired or required, the outputs of NOR gates 84, 86, 88 can be coupled directly to a visual display 46, such as an oscilloscope, to provide the precise frequency of oscillation, thereby providing the indication of which detector has sensed a water leak.

While not limited to the following components, the following table represents typical or approximate conventional items and values that may be employed in the instant circuit:

Resistor 58 — 220 kohms
Diode 68 — 1N914
Diode 66 — 1N914
Resistor 92 — 3.3 kohms
Resistor 94 — 180 ohms
Supply 44 — 9 volts
Resistor 82 — 10 kohms Therefore, it is apparent that the disclosed system for detecting and locating water leaks is an efficient versatile technique based on the generation of multiplexed indicator signals which employs compact, low-power integrated digital circuitry and a single, dual-wire interconnection line for economical deployment and ready expandibility.

One of the advantages of this active leak detector is that only two wires are needed to signal a water leak. Each active leak detector is uniquely defined by its own frequency of oscillation. By choosing other frequencies, more active leak detectors may be added in parallel for increased location coverage. The active leak detector uses low power CMOS integrated circuits and thus may be powered from batteries for long periods of time regardless of how many active leak detectors are added. The power source may be any voltage between five and fifteen volts, single polarity. Since only two wires are required, more active leak detectors may be added at a distant location without the need to run more wires to the added units from the leak indicator unit. This system will cost less than the older type systems since the present wires may be used when adding more active leak detection units.

Obviously, other embodiments and modifications of the present invention will readily come to those of ordinary skill in the art having the benefit of the teachings presented in the foregoing description and drawing.

Various types of sensors can be connected to produce logic-level changes at the input gate of the detector, and only two interconnect wires would be required to tie all the detectors to the indicator unit. Although a leak detector circuit monitor is shown, other types of monitoring may be employed. A frequency counter may be used to measure the precise frequency of oscillation and thus to indicate the precise location of a leak detector unit. Since each astable multivibrator has a unique frequency of oscillation, a frequency selective bandpass filter may be employed at the monitor site to activate a special alarm if a particular leak detector becomes activated. In this manner, one or several leak detectors may be given priority over others.

In addition, by merely substituting various other sensing means for the water electrodes in the above preferred embodiment, this concept can have wide application in the home, the office, and the factory. The active leak detector will detect water in basements, windows, boats and chemical leaks in factories.

Although used principally for water leak detection, the system can be adapted to many other applications by replacing the electrodes with a switch. This would allow use of the same technique in a system where a remote switch closure needs to be monitored. An example would be switch closures used for detecting burglars entering windows or doors. A heat or fire sensor switch could also be used to replace the electrodes for fire protection.

It is therefore to be understood that this invention is not to be limited thereto and that said modifications and embodiments are intended to be included within the scope of the appended claims.

What is claimed and desired to be secured by Letters Patent of the United States is:

1. A system for detecting and locating a fluid leak comprising:
    a plurality of sensing means for detecting a fluid, each situated in a different location;
    circuitry coupled to respective sensing means for providing an electrical signal indicative of a fluid sensed by the sensing means coupled thereto, said signal having a unique frequency different from any other sensing circuitry in the system; and
    an indicator unit electrically coupled in parallel to all of said sensing means through their respective circuitry for providing an indication and location of said fluid leak.

2. A system as recited in claim 1 wherein said circuitry includes an astable multivibrator to provide said unique frequency, said unique frequency determined by the RC time constant of said multivibrator.

3. A system as recited in claim 2 wherein said sensing means comprises a pair of electrodes and said fluid comprises water, whereby when water is present between said electrodes, current flows therebetween to cause said circuitry to provide said unique oscillator frequency.

4. A system as recited in claim 3 further including a power source; and
    only a single pair of lines to provide said power to said sensing means, said circuitry and said indicator unit, as well as provide the output signals of said circuitry to said indicator unit.

5. A system as recited in claim 4 wherein said circuitry comprises a CMOS unit arranged in a detecting, inverting and astable multivibrator arrangement.

6. A system as recited in claim 5 wherein said indicator unit comprises a CMOS unit arranged in a gate amplifier arrangement and an aural indicator to provide a tone indicative of said unique circuitry signals thereby identifying the location of the leak.

7. A system as recited in claim 4 further including:
    an isolation network coupled between said power source and said circuitry whereby each circuit is isolated from said power source and each of the other circuits.

8. A system as recited in claim 6 further including:
    filter means comprising an inductor in parallel with a resistor to isolate the power source from circuit output signals.

9. A system as recited in claim 8 wherein said indicating means includes a visual display to provide the frequency of oscillation of said circuit.

10. A system as recited in claim 9 wherein said power source comprises a 9 volt DC source and wherein said isolation network includes a capacitor chosen to be $1/1000\ F_L$ farads, where $F_L$ is the lowest frequency of oscillation of an astable multivibrator in said system.

* * * * *